United States Patent
Jeans

[19]

[11] Patent Number: 6,045,086
[45] Date of Patent: Apr. 4, 2000

[54] METHOD AND APPARATUS FOR IMPROVED TAPE PACKING

[75] Inventor: Albert H. Jeans, Mountain View, Calif.

[73] Assignee: Hewlett-Packard Company, Palo Alto, Calif.

[21] Appl. No.: 09/165,518

[22] Filed: Oct. 2, 1998

[51] Int. Cl.[7] .................................................. B65H 23/00
[52] U.S. Cl. .................................... 242/548.3; 242/615.4
[58] Field of Search .............................. 242/548.3, 566, 242/615.4, 345.2, 345.3, 346, 346.1, 348, 348.4, 358

[56] References Cited

U.S. PATENT DOCUMENTS

| | | | |
|---|---|---|---|
| 1,942,869 | 1/1934 | McMaster | 242/346.1 |
| 3,675,875 | 7/1972 | Schmidt | 242/345.3 |
| 3,804,351 | 4/1974 | Kaneko et al. | 242/345.2 |
| 3,942,744 | 3/1976 | Fitterer et al. | 242/345.2 |
| 3,977,626 | 8/1976 | Gaiser et al. | 242/345.2 |
| 4,154,886 | 5/1979 | Yamazaki et al. | 428/200 |
| 4,289,285 | 9/1981 | Ishida et al. | 242/345.3 |
| 4,343,441 | 8/1982 | Graham . | |
| 4,512,527 | 4/1985 | Rehklau et al. . | |
| 4,516,181 | 5/1985 | Shirako | 360/132 |
| 4,541,588 | 9/1985 | Sato | 242/345.5 |
| 4,563,718 | 1/1986 | Shirako | 360/132 |
| 4,607,306 | 8/1986 | Shirako | 360/132 |
| 4,789,110 | 12/1988 | Sakaguchi et al. . | |
| 4,854,517 | 8/1989 | Watanabe et al. . | |
| 4,909,455 | 3/1990 | Sakaguchi et al. . | |
| 5,484,117 | 1/1996 | Tollefson | 242/345.2 |
| 5,533,690 | 7/1996 | Kline et al. | 242/547 |
| 5,645,241 | 7/1997 | Koga et al. | 242/336 |

*Primary Examiner*—John M. Jillions
*Attorney, Agent, or Firm*—Trueman H. Denny, III

[57] ABSTRACT

The invention relates to a method and an apparatus for neat winding a film or the like to reduce scatterwinds. The apparatus includes a packing guide for engaging an edge of a film as the film is being wound and a support member for positioning the packing guide relative to a film pack. As the film pack is wound the packing guide aligns a circumferentially outer edge of the film with an adjacent inner edge so that scatterwinds are reduced and the film pack has a substantially planar surface.

12 Claims, 13 Drawing Sheets

METHOD AND APPARATUS FOR IMPROVED TAPE PACKING

BACKGROUND OF THE INVENTION

The present invention relates generally to an apparatus for neatly winding a film onto a reel or other structure and more particularly to an apparatus incorporating a flexible member for applying force to an edge of a film being wound such that the film pack is wound without scatterwinds and without damage to the film or the flexible member.

When a film is wound onto a reel, air is entrained between adjacent layers of film. The entrained air causes the adjacent layers of film to slip relative to each other before the air can bleed out and the film settles onto a film pack. The slipping between adjacent layers of film results in a displacement between the edges of the adjacent layers, subsequently, the edge of one layer may be higher or lower than the edge of an adjacent layer. A film pack being wound at high speeds can have many floating layers of film on the pack. Often, these floating layers become unstable and can shift large distances laterally. This is called scatterwinding. In extreme cases, without a flange present, the film can come completely off the reel. Scatterwinds create protruding edges of film that are subject to damage and cause the film to be misaligned when the film is unwound. The present invention minimizes scatterwinds without imposing excessive force on the film which could result in damage to the film or to the invention itself.

In minimizing scatterwinds it is desirable to minimize contact force and friction between the flexible member and the film being wound. Lower friction results in less wear to the film and the flexible member. Additionally, it is desirable to reduce or eliminate friction between the flexible member and the film when the film pack is being unwound.

There are many applications where a film, a tape, or other flexible material requires consistent and uniform collection onto a structure such as a spool, a hub, or a reel. Uniformity in winding of a film or the like onto a spool, for example, is necessary when the film is passed through a series of stationary guide elements that are aligned with the film path. Any misalignment of the film can result in excessive vibration, wear, and damage to the film as it passes through the guide elements.

Another advantage to eliminating scatterwinds in a film pack or the like, is in eliminating damage to the film caused by shipping, transportation, or handling of the film pack. A film pack having scatterwinds exposes displaced edges of the film to damage from the reel or similar structure that comes into contact with the exposed edges. A film having minimal scatterwinds is less susceptible to damage because the edges of adjacent film layers are aligned. The aligned edges form a substantially planar surface that spreads the contact force evenly across the surface of the film pack.

The present invention is applicable to reducing damage to a film that is repeatedly wound and unwound between two separate reels. By eliminating or reducing scatterwinds on the reel that is being wound, the film is subject to minimal wear and damage as it travels between the two reels. As a reel is being unwound to transfer the film to the other reel, reduced scatterwinds in the film pack of the reel being unwound provide for minimal lateral movement and vibration of the film as it travels to the reel that is being wound, thereby reducing additional wear or damage to the film as it interacts with other elements that come into contact with the film during the transfer.

Previous attempts at neatly packing a film onto a film pack include self-packing glass reels, liner sheets, magnetic force, and mechanical force.

Self-packing glass reels are precision tape reels with glass flanges. Spacing between the flanges is not less than the width of the tape at an inner diameter of the flange, however, the spacing between the flanges decreases slightly, in a radially outward direction, from the inner diameter to an outer diameter of the flange. The decreased spacing of the flanges constrains lateral motion of the tape, and as the tape pack enlarges, the tape pushes the flanges apart. The disadvantages of this solution are in the cost of the reels and the way in which the tape is rigidly guided by the flanges, making alignment with other guide elements in the tape path critical. Misalignment of the tape relative to the guide path can result in damage to the tape. Additionally, contact between the tape and the flanges results in tape edge damage and tape wear.

Liner sheets are typically used in cassette tape housings, for example DDS cassettes. In a DDS tape cassette, the tape reels have no flanges. Instead, there are two plastic liner sheets on either side of a tape pack. The liner sheets have stationary projections that extend outward of the liner sheet. The projections are in continuous contact with at least a portion of the tape pack. The liner sheets may be coated with a lubricant to reduce friction between the liner sheet and the tape pack. The projections in the liner sheet serve to urge the edges of the tape into alignment as the tape is wound onto the tape pack. There are several disadvantages to liner sheets. The projections contact the tape pack over a large area. As the tape is wound or unwound portions of the tape pack that come into contact with the projections are subject to friction and wear. As a result, after the projections have aligned the edges of the tape, the projections continue to make contact with the tape pack. In particular, heat caused by friction between the tape pack and the large contact area could become excessive at high tape winding speeds. The heating, friction, and wear associated with the liner sheets is exacerbated during the high winding speeds associated with fast forward and fast reverse tape winding.

Magnetic neat winding devices rely on magnetic fields generated by an electromagnet or a permanent magnet to align a film. The magnetic field urges the film into alignment by exerting magnetic forces on the film. The magnet may be positioned radially outward of the film pack or positioned above or below the film pack. Mechanical force from a pulley or the like may also be employed to aid in aligning the film. The main disadvantage of magnetic neat winding is that it requires that the medium being wound have magnetic properties. Additionally, the film must be blank to avoid erasure of magnetic data on the film. Further, the sophistication, power requirements, and size of the mechanisms required to implement magnetic neat winding preclude its use in portable applications.

Additionally, magnetic neat winding devices may incorporate pneumatics to assist in neat winding a film pack. A nozzle to evacuate air in the vicinity of the wound film is used to deplete air entrained between the film layers. Additionally, another nozzle can be used to blow air between film layers, thereby allowing adjacent film layers to float relative to each other. The floating layers allow for movement between the adjacent layers so that the film can be urged into position for alignment by the magnetic field. The disadvantage of using pneumatics to assist in magnetic neat winding is in the complexity, size, and cost of implementing a pneumatic system. Pneumatics are not amendable for use in portable film apparatus, can not be economically implemented in film cassettes or cartridges, and are mostly limited to neat winding of film in a production environment.

Mechanical neat winding devices generally use pulleys, capstans, pinch-rollers, guides, belts and the like to urge a film into alignment with a film pack or to constrain lateral movement of the film as it is being wound. Belts are used to either impinge on the surface of the film to displace air entrained between adjacent layers, or to contact an edge of the film as the film is being wound. To displace entrained air, the belt must apply a high pressure to the film, therefore, continuous contact between the belt and the film is required. The contact can result in embossing of the film by the belt. Belts are mechanically complex, bulky, and are not practical for portable neat winding applications. Pulleys, capstans, pinch-rollers, guides, and similar mechanical methods of neat winding a film pack use mechanical force to align a film. In a typical application these methods either displace entrained air by pressing against a film as it is wound or restrain lateral motion of the film as the film is wound. Restraining lateral movement of the film can also damage the film, particularly at the film edges. The main disadvantage of mechanical neat winding devices is the size and complexity required to accommodate a film pack of varying size.

From the foregoing it will be apparent that there is a need for a simple, portable, and economical means for reducing scatter winds in a film pack. Further, it will be apparent that low wear and minimal film damage are desirable properties in an apparatus for reducing scatterwinds.

SUMMARY OF THE INVENTION

The present invention provides an apparatus for reducing scatterwinds in a film pack. The apparatus includes a packing guide for engaging a circumferentially outer edge of a film pack and for urging the outer edge into alignment with an adjacent edge of the film pack. Contact force between the packing guide and the edge of the film is minimized by the present invention. A low contact force results in minimal wear and friction to the film pack and the packing guide. The packing guide is connected to a support that positions the packing guide relative to the film pack. The packing guide enables film, tape, or other flexible material to be wound onto a spool or similar structure with minimal scatterwinds. Additionally, the packing guide is effective over a wide range of film winding speeds, can be adapted to handle films of different widths and thicknesses, and can be used on films with magnetic data without the danger of erasure due to magnetic fields.

An apparatus embodying the invention is economical, mechanically simple, easy to manufacture from a variety of materials, light weight, capable of repeated winding operations, compact, adaptable to production and portable neat winding applications, and minimizes wear and damage to a film as the film is wound or unwound.

In a preferred embodiment, a flexible sheet of elastic material has a support edge and a contact edge distal to the support edge. The flexible sheet defines a packing guide. A support member connected to the support edge of the packing guide supports the packing guide and positions the packing guide relative to a film pack to be wound. The support member orients the contact edge of the packing guide with a circumferentially outer edge of a film pack.

In one embodiment, the support member is a cantilever having a proximal end connected to the support edge of the packing guide and a distal end adapted for attachment to a support. The cantilever is stationary with respect to the film pack. Optionally, the distal-end of the cantilever can be movably attached to a support to allow for the orientation of the packing guide or the contact edge to be altered relative to the film pack. The packing guide may be made from a variety of materials including layers of identical or dissimilar materials, or dissimilar sheets of material connected on an edge.

In another embodiment, the contact edge of the packing guide is modified to reduce friction between the contact edge and the circumferentially outer edge of the film pack, for example, by coating the contact edge with a low friction material or by using a separate sheet of material having low friction properties for the contact edge.

In another embodiment, the packing guide is inclined at an angle with a wound surface of the film pack. As the film pack is wound, air flow along the surface is deflected upward by the packing guide and travels along the surface of the packing guide opposite the wound surface. The air flow imparts a downward force on the packing guide such that the contact force between the contact edge and the circumferentially outer edge of the film pack is increased when the film pack is wound. When the film pack is unwound the air flow impinges on the surface of the packing guide facing the wound surface of the film pack, reducing the contact force between the contact edge and the circumferentially outer edge of the film pack when the film pack is unwound.

A method of winding a film or the like according to the present invention may include the following steps, attaching the film to a structure for receiving the film, positioning the packing guide relative to the structure, rotating the structure to collect the film onto the structure, and stopping rotation of the structure when a predetermined amount of film has been collected.

Other aspects and advantages of the present invention will become apparent from the following detailed description, taken in conjunction with the accompanying drawings, illustrating by way of example the principles of the invention.

DETAILED DESCRIPTION

Figure 1:
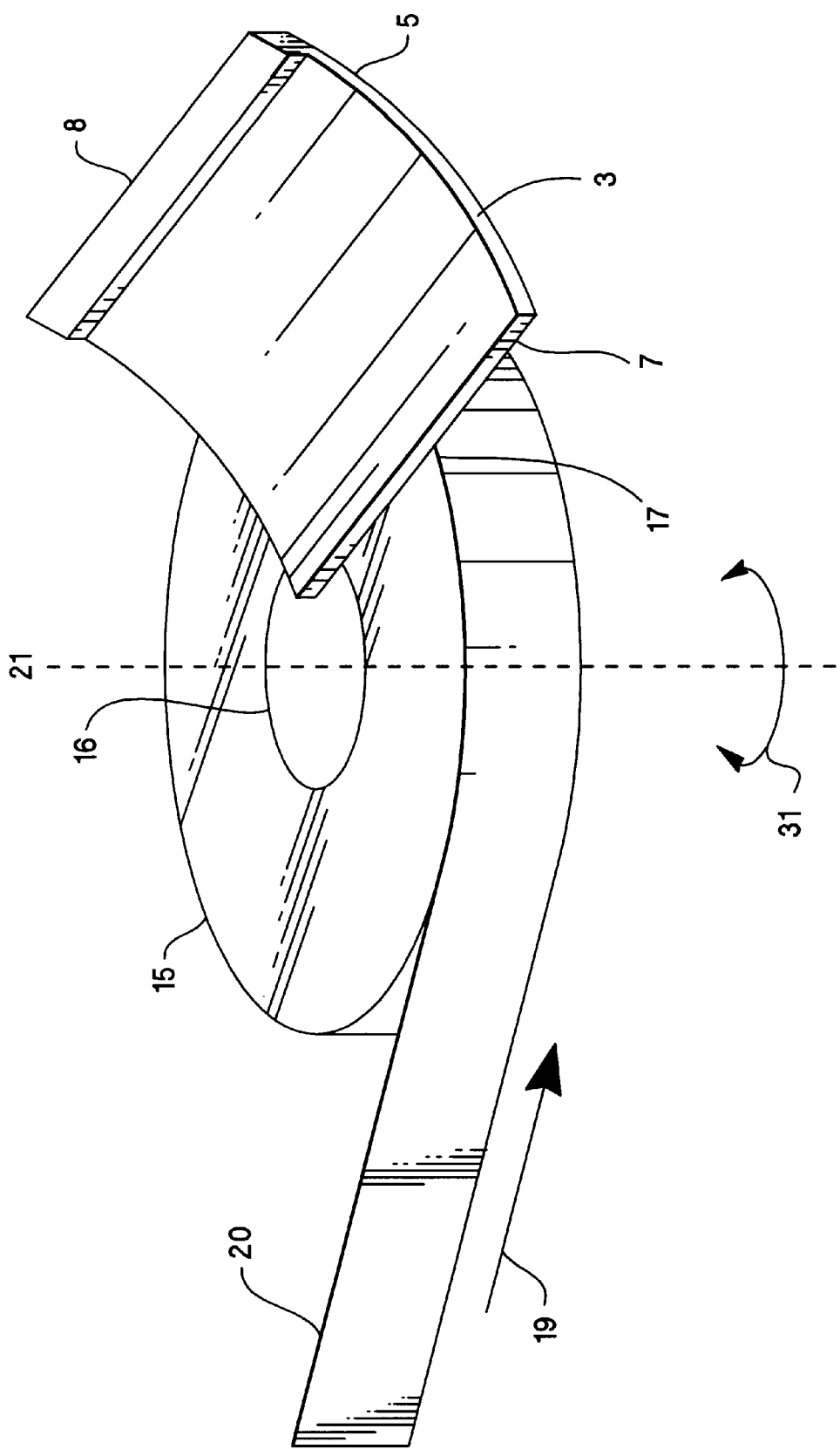
FIG. 1 is a perspective view of an apparatus according to the present invention.

In the following detailed description and in the several figures of the drawings, like elements are identified with like reference numbers.

As shown in the drawings for purposes of illustration, the invention is embodied in an apparatus having a flexible sheet of elastic material defining a packing guide and a support member for positioning the packing guide relative to a film pack to be wound. An edge of the packing guide contacts a circumferentially outer edge of the film pack as the film pack is wound. The packing guide aligns the circumferentially outer edge of the film pack with a radially inward edge of the film pack as the film pack is wound, thereby reducing scatterwinds in the film pack. Previous apparatus for neat winding a film pack have incorporated complex and bulky mechanisms such as magnets, pneumatics, belts, liner sheets, pulleys, rollers, and other mechanical structures to force a film into alignment. The apparatus of the present invention is economical to manufacture, provides consistent reduction of scatterwinds while reducing damage and wear to the film being wound, can be scaled to any size, is adaptable to a wide variety of neat winding applications, is light weight, and can be implemented in portable or production neat winding applications.

Referring to FIG. 1, there is provided in accordance with the present invention an apparatus generally designated as 1. The apparatus includes a flexible sheet of elastic material defining a packing guide 3. The packing guide 3 has a support edge 5 and a contact edge 7 extending outward of the support edge 5. The packing guide 3 is positioned relative to a film pack 15 by a support member 8. The support edge 5 of the packing guide 3 is connected to the support member 8. The support member 8 is operative to orient the contact edge 7 with a circumferentially outer edge 17 of the film pack 15 so that the contact edge 7 is urged into contact with the circumferentially outer edge 17. For purposes of illustration, the film pack 15 may include a structure 16 such as a hub, a reel, a spool, or the like for collecting the film 20 to be wound. As shown in FIG. 1, the film pack 15 rotates as shown by arrow 31 about an axis of rotation 21. As the film 20 is wound onto the film pack 15 the direction of travel of the film 20 is shown by arrow 19. The film 20 may be any flexible material such as tape, photographic film, magnetic tape, film, or the like.

The support member 8 may be any structure suitable for positioning the packing guide 3 relative to the film pack 15. For example, the support member 8 could be an interior surface of a housing incorporating the apparatus 1 of the present invention. Methods for connecting the support edge 5 to the support member 8 include gluing, welding, fasteners, adhesives, or other suitable methods for providing a secure connection. The support member 8 can be made from materials such as metals, glass, plastics, ceramics, rubber, or the like.

Figure 2:
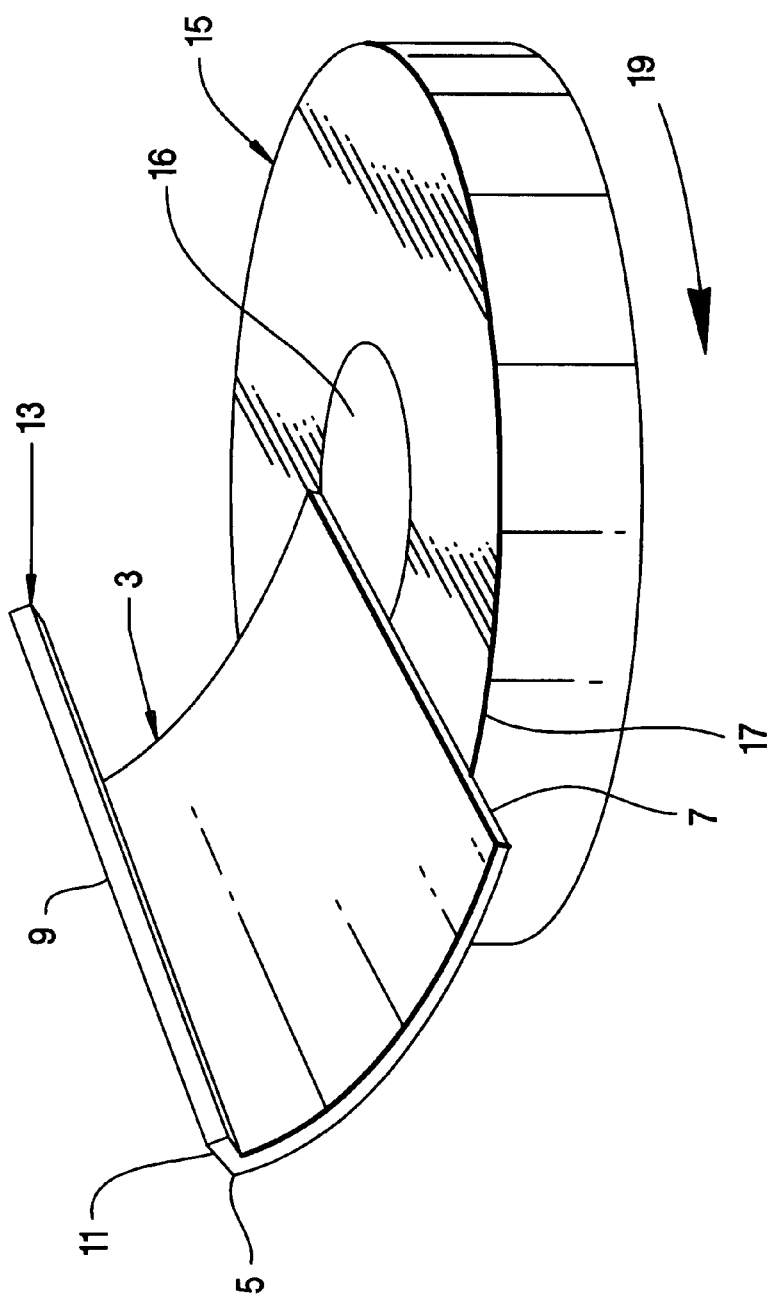
FIG. 2 is a perspective view of a packing guide having a cantilever for the support member according to the present invention.

In an alternative embodiment, the support member 8 is a cantilever 9 having a proximal end 11 and a distal end 13, as illustrated in FIG. 2. The distal end 13 is adapted for attachment to a support. The support edge 5 of the packing guide 3 is attached to the proximal end 11 of the cantilever 9.

Figure 3:
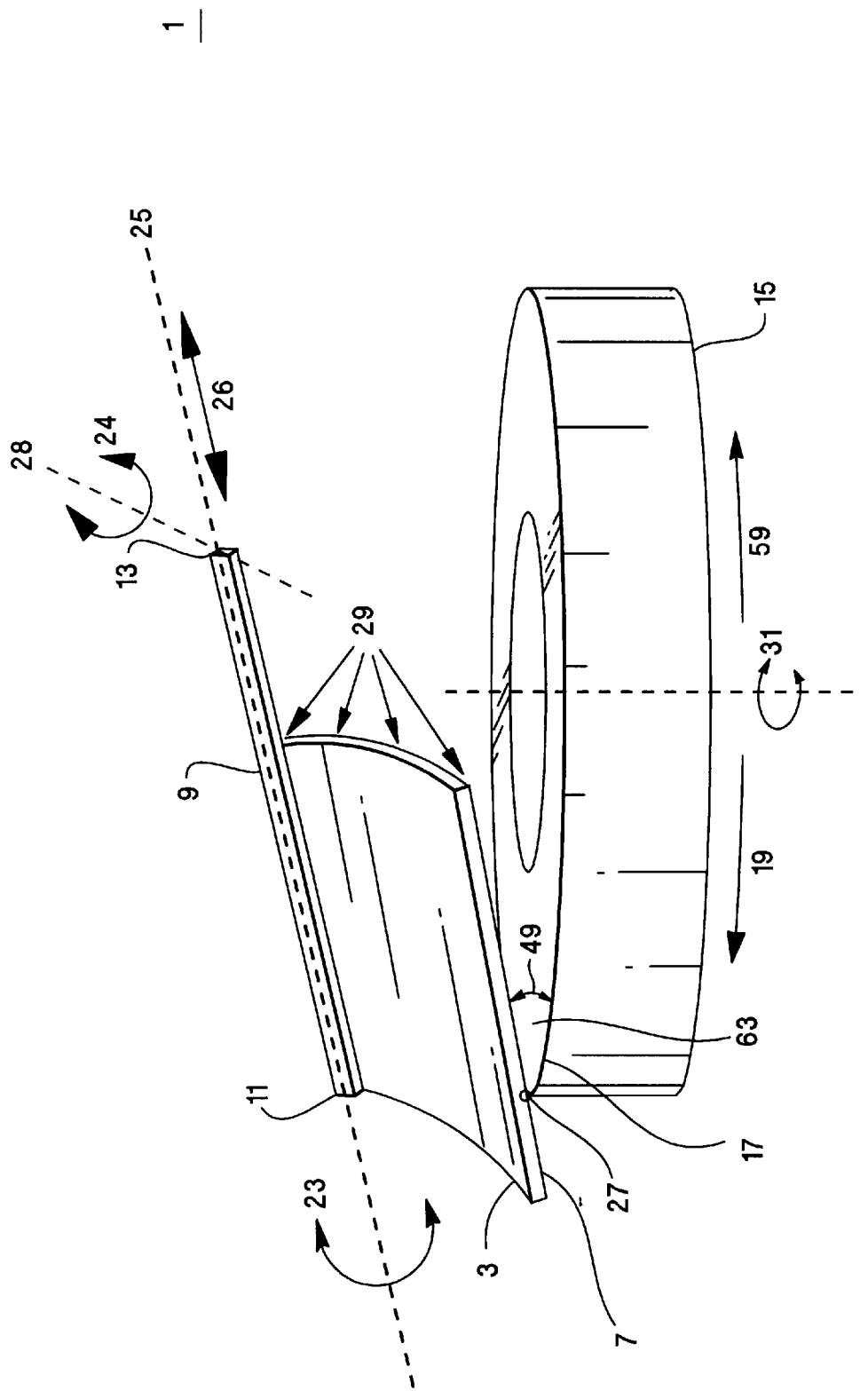
FIG. 3 is a perspective view of a packing guide with a support member adapted for movement according to the present invention.

In another embodiment, as illustrated in FIG. 3, the position of the packing guide 3 relative to the film pack 15 and the orientation of the contact edge 7 with the circumferentially outer edge 17 can be modified by rotation of the cantilever 9 about its longitudinal axis 25 as shown by arrow 23, by pivoting of the cantilever 9 at the distal end 13 about its transverse axis 28 as shown by arrow 24, or by translation of the cantilever 9 along the longitudinal axis 25 as shown by arrow 26. Additionally, the orientation of the contact edge 7 with the circumferentially outer edge 17 and the position of the packing guide 3 relative to the tape pack 15 can be modified by any combination of rotation 23, translation 26, or pivoting 24, such that the packing guide 3 conforms to a predetermined surface contour as shown by arrows 29.

For example, rotation 23 of the cantilever 9 can be used to modulate the contact force between the contact edge 7 and the circumferentially outer edge 17 as the film pack 15 is wound and the circumferentially outer edge 17 advances in a radially outward direction. Pivoting 24 may also be used to disengage the contact edge 7 from the film pack 15, for example, when the film pack 15 is being unwound 59. In applications where the length of the contact edge 7 does not exceed the radius of a completely wound film pack 15, translation 26 of the cantilever 9 can be used to move the packing guide 3 in a radially outward direction, so that the contact edge 7 remains in contact and in proper orientation with the circumferentially outer edge 17 as the film pack 15 is wound. Additionally, rotation 23, translation 26, or pivoting 24 can be accomplished with a support structure other than the cantilever 9, for example, support member 8.

Orientation of the contact edge 7 and the position of the packing guide 3 can be altered to determine a contact patch 27 between the contact edge 7 and the circumferentially outer edge 17. The contact patch 27 represents the footprint of an area of contact between the contact edge 7 and the circumferentially outer edge 17. The contact patch 27 may be a line segment, an arc, or other shape. Friction and wear between the contact edge 7 and the circumferentially outer edge 17 may be minimized by reducing the area of the contact patch 27. The contact edge 7 may be shaped to modify the contact patch 27, for example, by employing a blunt, beveled, tapered, or rounded contact edge 7.

The packing guide 3 may be made from a variety of flexible materials, for example, polyesters, elastomers, metal, plastics, paper, cloth, composites, carbon fiber, and ceramics. Additionally, the packing guide 3 may be a composite sheet made from a ply of different flexible materials laminated together. In one embodiment, the packing guide 3 comprises two or more flexible sheets joined at their edges. The innermost sheet is connected to the support member 8. The outermost sheet defines the contact edge 7. Important characteristics of the packing guide 3 are that it be flexible to maintain contact between the contact edge 7 and the circumferentially outer edge 17 of the film pack 15, and to maintain orientation of the contact edge 7 with the circumferentially outer edge 17. Further, the material selected for the contact edge 7 must be compatible with the material properties of the film pack such that the tribology is consistent with the goal of low friction between the contact edge 7 and the circumferentially outer edge 17 of the film pack 15. Reduced friction prevents damage and wear to the packing guide 3 and the film pack 15.

Figure 4:
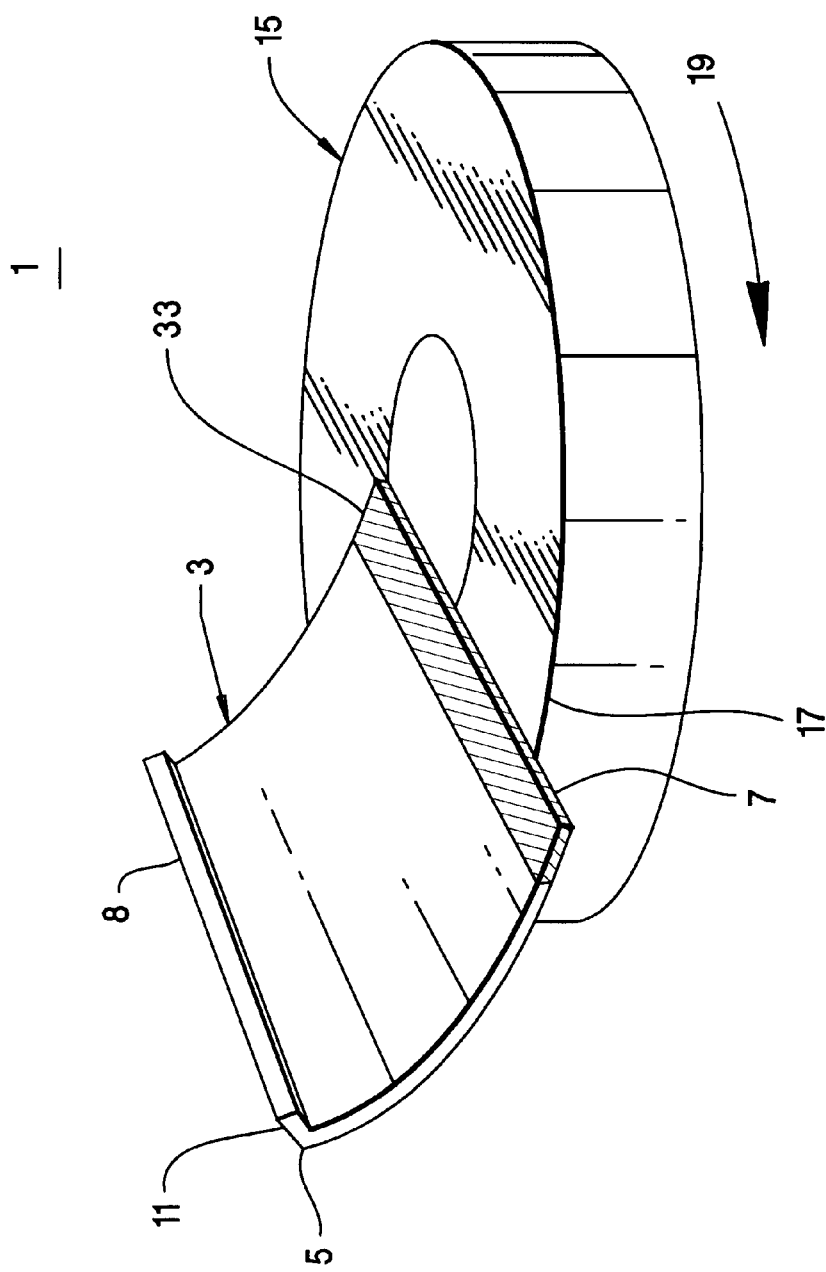
FIG. 4 is a perspective view of a packing guide with a bearing surface on the contact edge according to the present invention.

In one embodiment of the present invention, as illustrated in FIG. 4, friction is reduced by applying a bearing surface 33 to the contact edge 7 of the packing guide 3. The bearing surface 33 can be a low friction coating, such as graphite or a polymer such as PTFE, applied to the contact edge 7. Alternatively, the packing guide 3 can be a composite defined by a plurality of flexible sheets, with the last sheet defining the bearing surface 33.

In another embodiment of the present invention, as illustrated in FIGS. 5 through 10, flexibility of the packing guide 3 is tuned to alter the contact force and orientation of the contact edge 7 with the circumferentially outer edge 17 of the film pack 15. A flexibility tuner in communication with the packing guide 3 can be used to adjust flexibility. Size, shape, orientation, and position of the flexibility tuner are selected to obtain the desired flexibility of the packing guide 3. The flexibility tuner can be implemented by removing material from the packing guide 3, by adding material such as another sheet of flexible material having a predetermined shape to the packing guide 3, or by modifying the surface of the packing guide 3.

Figure 5:
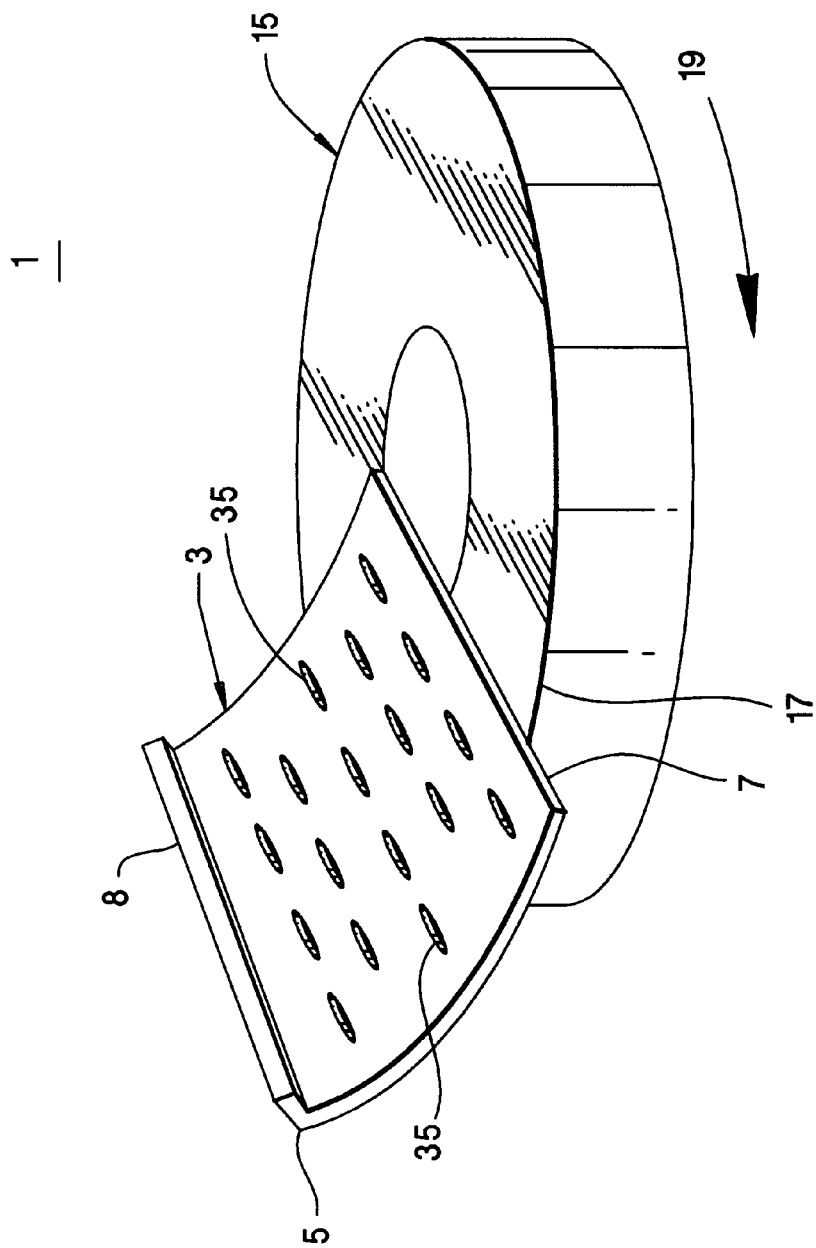
FIG. 5 is a perspective view of a packing guide with perforations according to the present invention.
Figure 6:
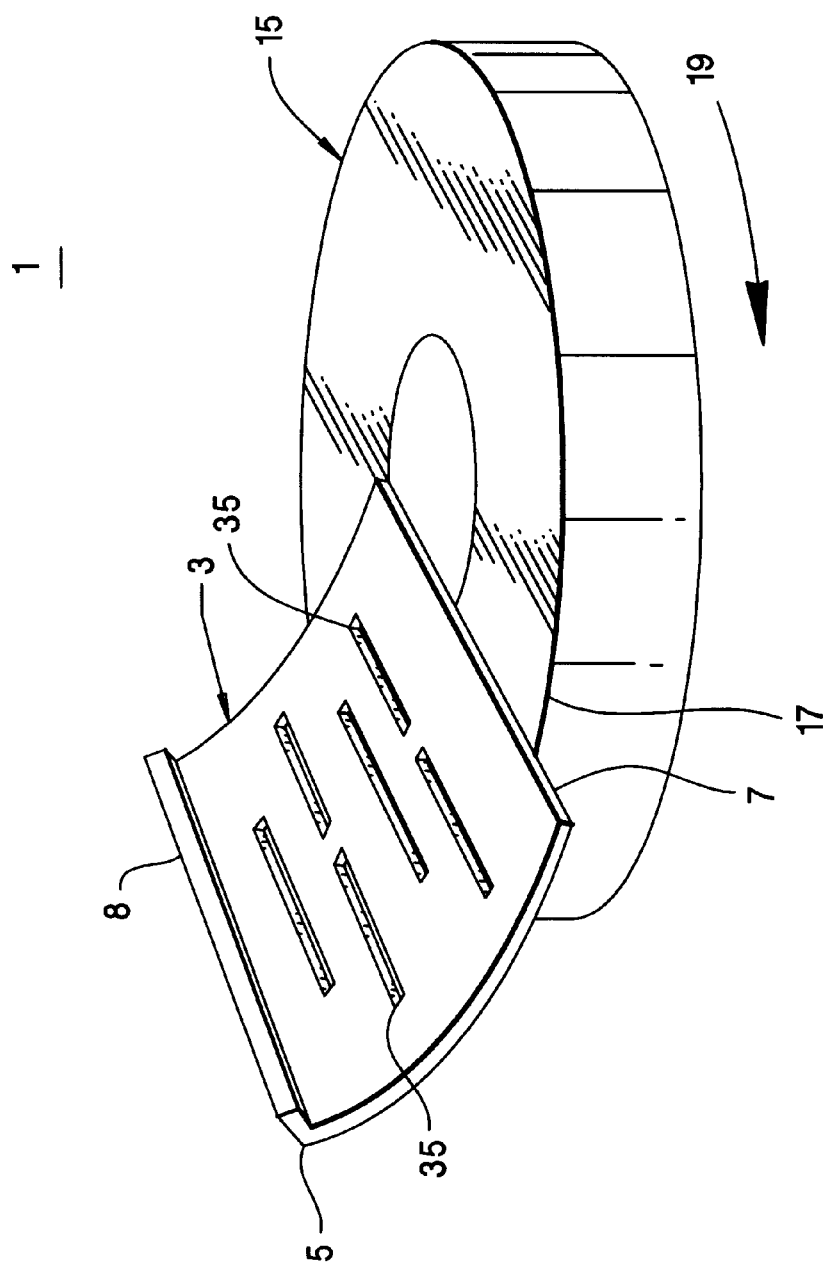
FIG. 6 is a perspective view of a packing guide with perforations according to the present invention.

FIG. 5 and FIG. 6 illustrate the use of perforations 35 as a flexibility tuner. The perforations 35 extend through the surface of the packing guide 3 and can be created by removing material from the packing guide 3, for example, by punching holes, cutting slots, or the like through the packing guide 3. In FIG. 6 the perforations 35 are formed by cutting slots in the packing guide 3. The perforations 35 may vary in length and shape, and may be positioned in any orientation on the packing guide 3.

Figure 7:
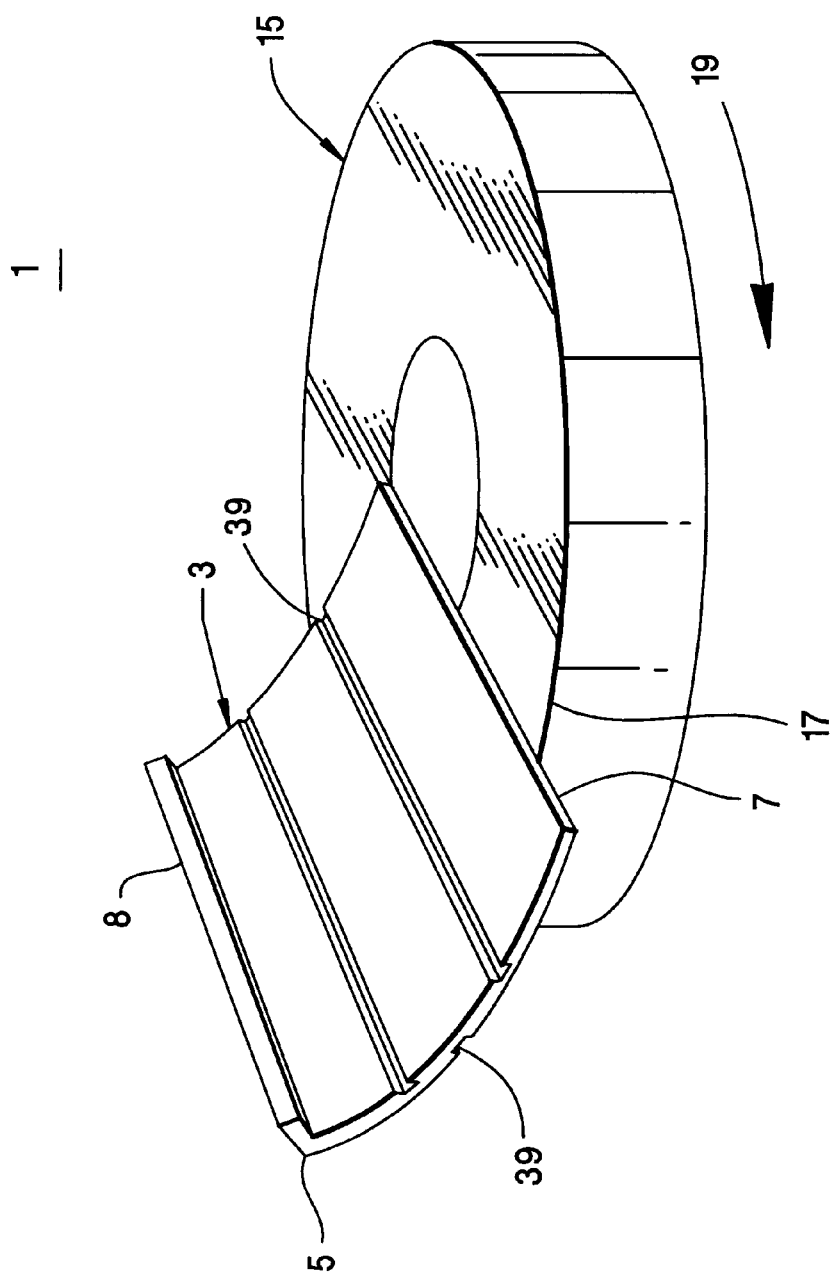
FIG. 7 is a perspective view of a packing guide with grooves according to the present invention.

FIG. 7 illustrates using grooves 39 as the flexibility tuner. The grooves 39 may be on either surface of packing guide 3. The grooves 39 do not extend through the surface of the packing guide 3. Any method suitable for forming a groove in a flexible material may be used to create the grooves 39. The grooves 39 may be positioned in any orientation on the packing guide 3.

Figure 8:
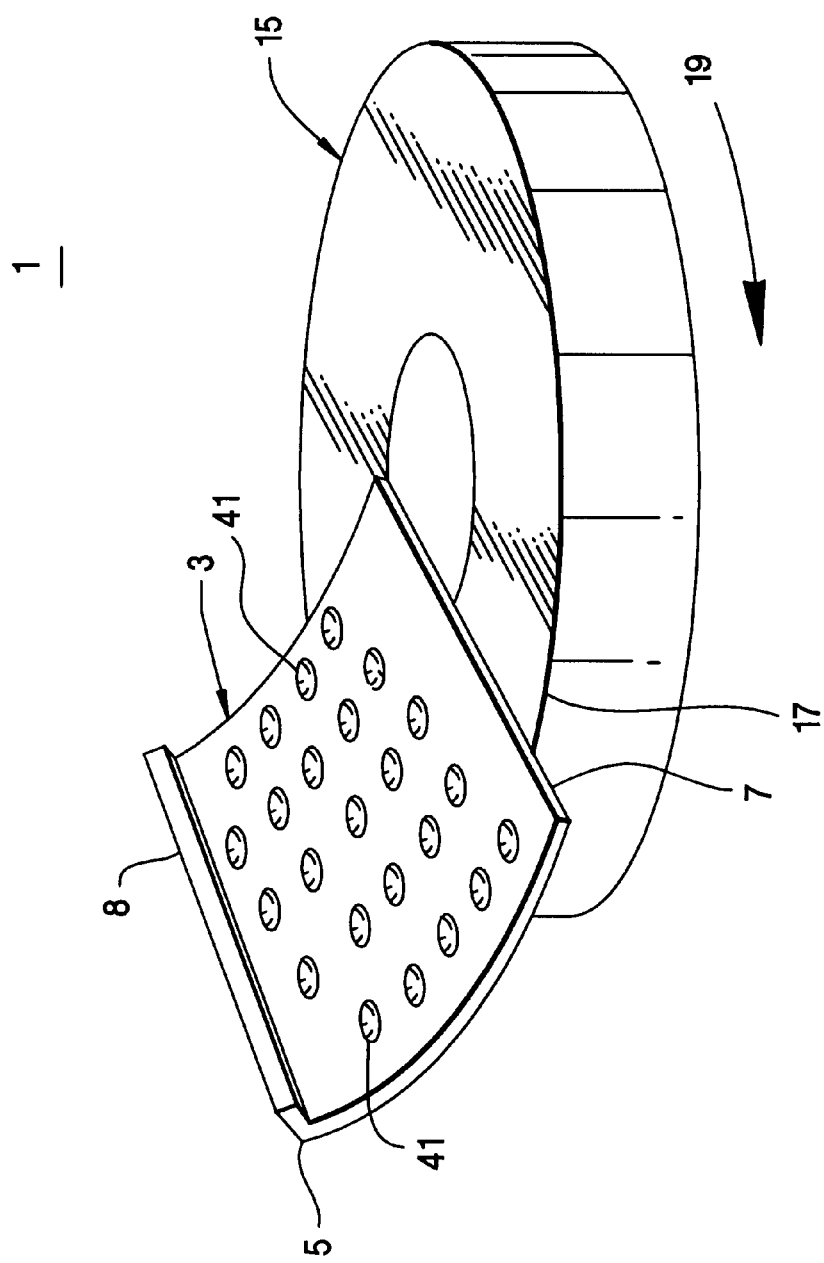
FIG. 8 is a perspective view of a packing guide with dimples according to the present invention.

In FIG. 8, dimples 41 disposed on a surface of the packing guide 3 form the flexibility tuner. The dimples 41 do not extend through the surface of the packing guide 3 and may be positioned in any orientation on the packing guide 3. Additionally, the dimples 41 may be on either surface of the packing guide 3. The dimples 41 are similar to those on a golf ball, however, the dimples 41 may be any shape. The dimples 41 may be formed, for example, by impressing a dimple pattern on a surface of the packing guide 3.

Figure 9:
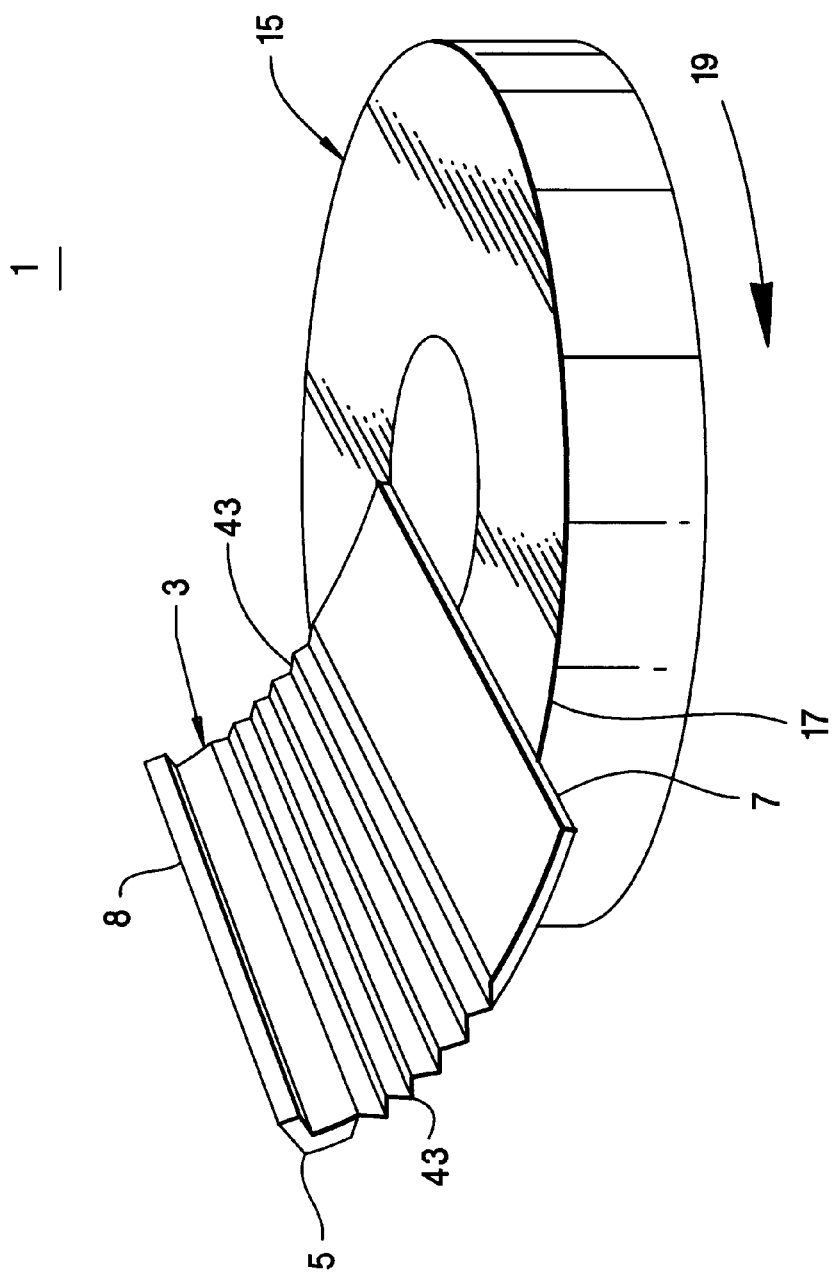
FIG. 9 is a perspective view of a packing guide with pleats according to the present invention.

FIG. 9 illustrates the use of pleats 43 as the flexibility tuner. The pleats 43 may be positioned in any orientation on the packing guide 3, and may be formed by impressing a pleat pattern on a surface of the packing guide 3.

Figure 10:
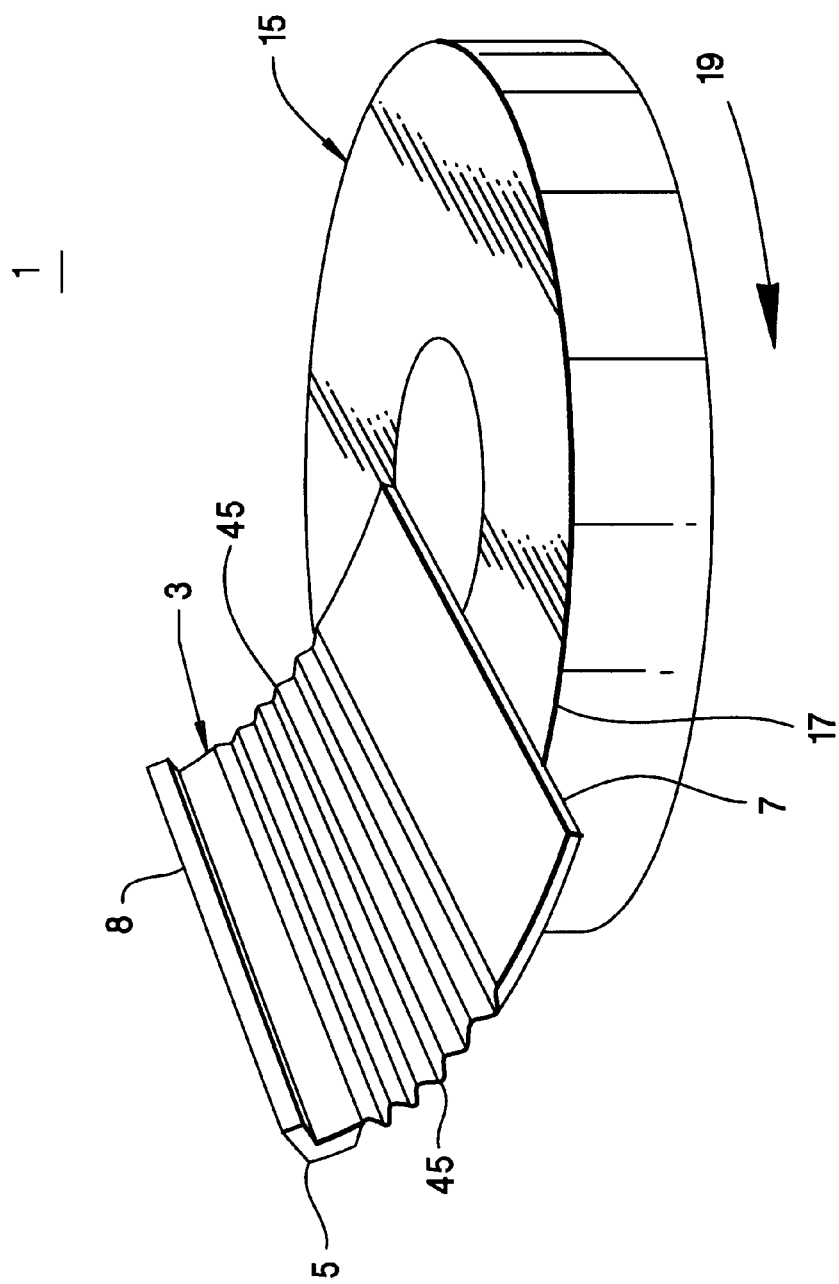
FIG. 10 is a perspective view of a packing guide with corrugations according to the present invention.

In FIG. 10, corrugations 45 are used for the flexibility tuner. The corrugations 45 may be positioned in any orientation on the packing guide 3, and may be formed by impressing a corrugation pattern on a surface of the packing guide 3.

Figure 11:
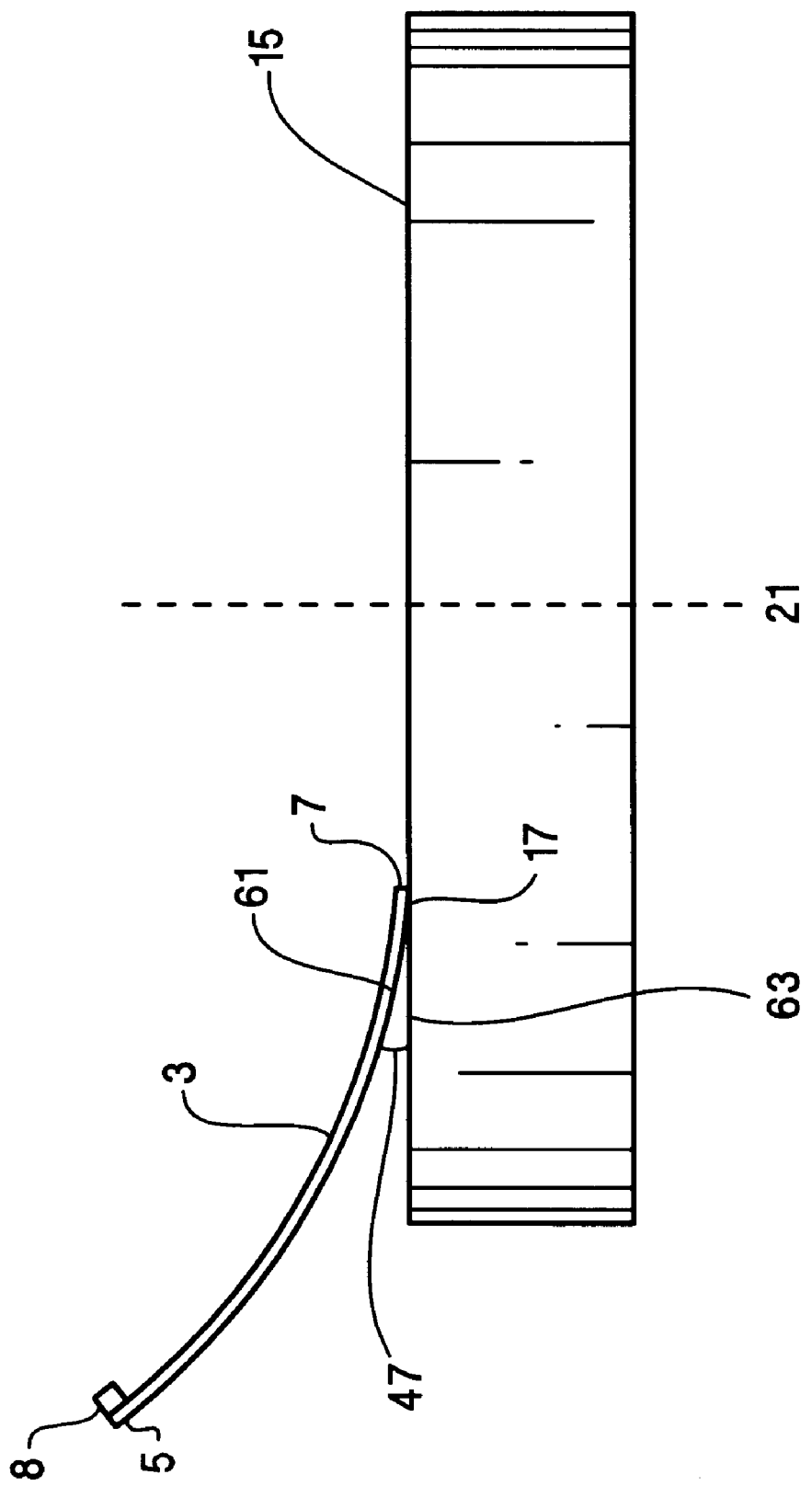
FIG. 11 is a cross section showing surface angle of the packing guide according to the present invention.

In an another embodiment of the present invention, as illustrated in FIG. 11, the support member 8 positions the packing guide 3 over the film pack 15 so that a narrow surface angle 47 is established between a pack surface 63 of the film pack 15 and a guide surface 61 of the packing guide 3. The surface angle 47 is measured substantially near the circumferentially outer edge 17 of the film pack 15 and the contact edge 7. The surface angle 47 is in the range of about 0 degrees to about 20 degrees, more preferably from about 0 degrees to about 10 degrees, even more preferably from about 0 degrees to about 2 degrees, and most preferably 0 degrees.

In another embodiment of the invention, as illustrated in FIG. 3, the cantilever 9 orients the contact edge 7 of the packing guide 3 so that a narrow edge angle 49 is established between the contact edge 7 and the pack surface 63. The edge angle 49 is measured substantially near the circumferentially outer edge 17 of the film pack 15 and the contact edge 7. The edge angle 49 is in the range of about 1 degree to about 10 degrees, most preferably from about 5 degrees to about 10 degrees. The edge angle 49 should never be 0 degrees as this would place the entire contact edge 7 into contact with the pack surface 63 resulting in excessive wear and damage to both the film pack 15 and the packing guide 3. As the film pack 15 is wound the edge angle 49 remains substantially constant as the circumferentially outer edge 17 advances in a radially outward direction.

Figure 12:
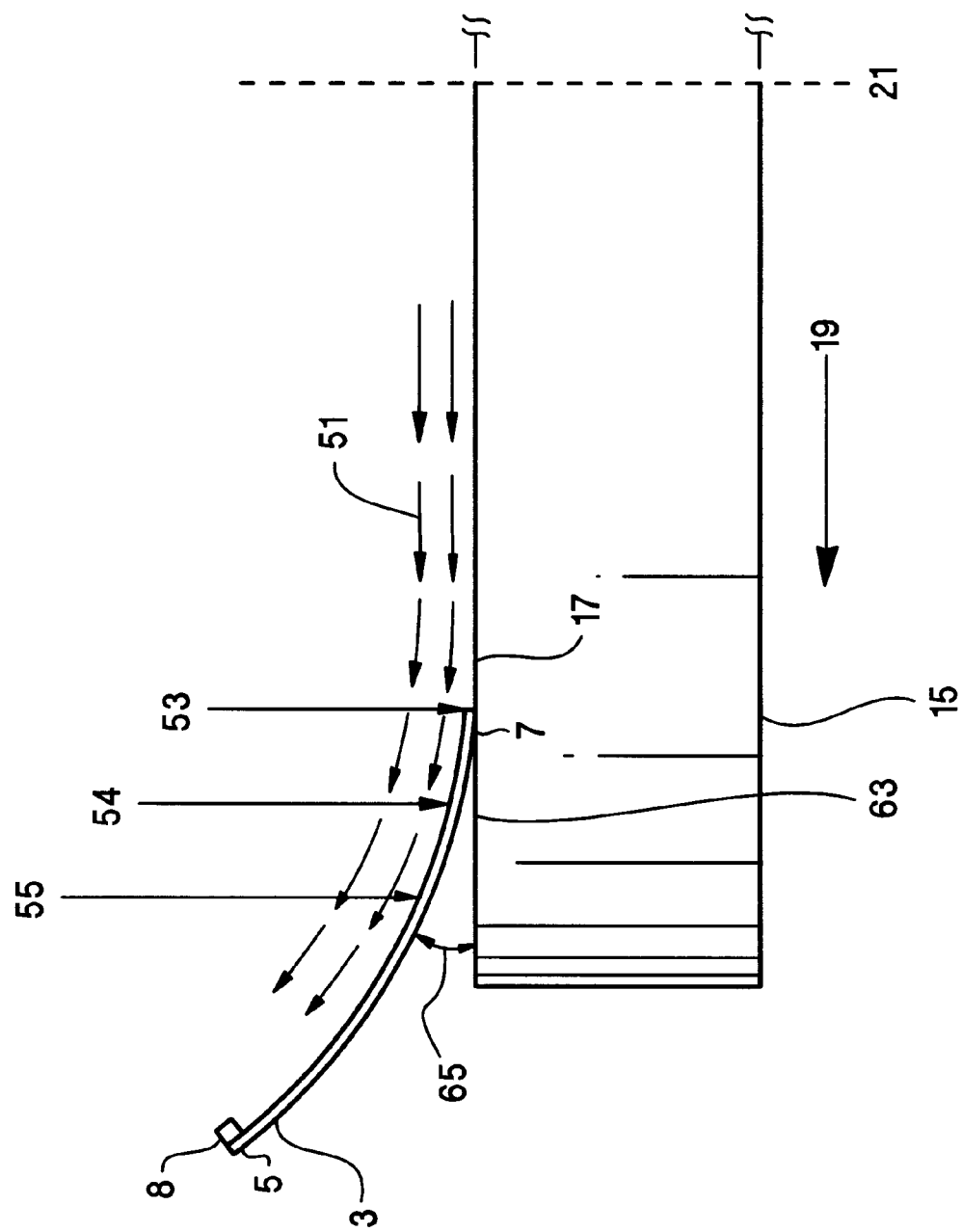
FIG. 12 is a cross section showing air flow over the packing guide according to the present invention.

In a preferred embodiment of the present invention, as illustrated in FIG. 12, the support member 8 orients the contact edge 7 with the circumferentially outer edge 17 so that the contact edge 7 is engaged with the circumferentially outer edge 17 with a first force 53. The support member 8 is operative to incline the packing guide 3 at a narrow guide angle 65 with respect to the wound surface 63 of the film pack 15. As the film pack 15 is wound as shown by arrow 19 an air flow 51 is induced and the inclination of the packing guide 3 at the guide angle 65 and the proximity of the contact edge 7 with the wound surface 63 operate to redirect the air flow 51 away from the wound surface 63. The air flow 51 travels over the packing guide 3 and imparts a second force 55 on the packing guide 3 such that the second force 55 acts in cooperation with the first force 53 to urge the contact edge 7 into contact with the circumferentially outer edge 17 with a net force 54 that is greater than the first force 53. The guide angle 65 is from about 5 degrees to about 45 degrees, more preferably from about 10 degrees to about 30 degrees, most preferably from about 10 degrees to about 20 degrees. The guide angle 65, the first force 53, the second force 55, and the net force 54 will vary based on application specific factors, for example, the type of film 20, the speed of rotation 31, the mass and dimensions of packing guide 3, and the orientation of packing guide 3 relative to the film pack 15.

Figure 13:
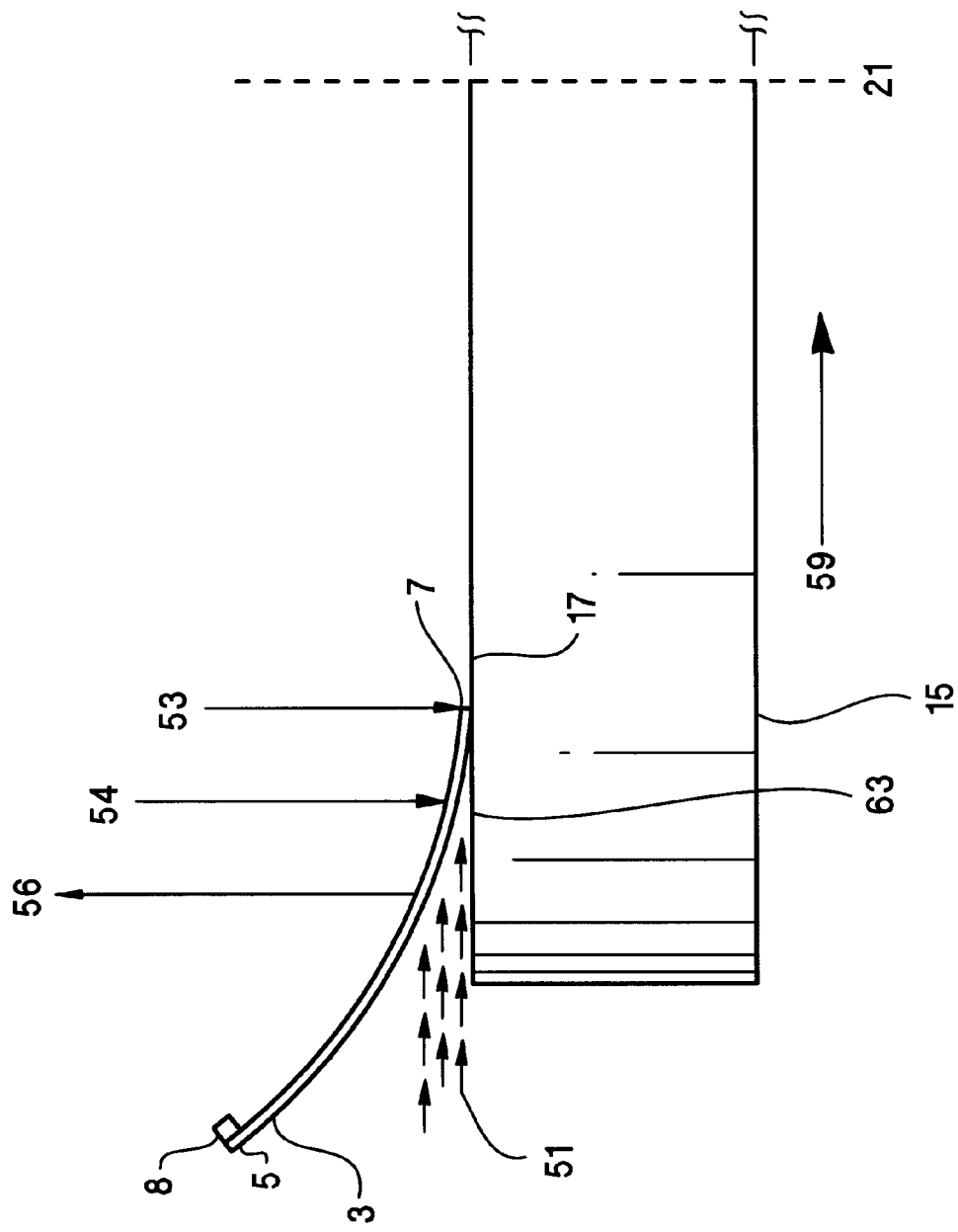
FIG. 13 is a cross section showing air flow under the packing guide according to the present invention.

In another embodiment of the invention, as illustrated in FIG. 13, the air flow 51 is generated as the film pack 15 is unwound as shown by arrow 59. The air flow 51 is trapped between the packing guide 3 and the wound surface 63 of the film pack 15 and imparts a lift force 56 on the packing guide 3 such that the contact edge 7 is urged away from the circumferentially outer edge 17 by the lift force 56. The lift force 56 acts in opposition to the first force 53 so that the net force 54 acting on the contact edge 7 is less than the first force 53. The lift force 56 will vary based on the application specific factors mentioned above.

In a preferred embodiment of a method according to the present invention, the film 20 is attached to a structure 16, for example, a spool, a hub, or a reel adapted for collecting the film 20. The packing guide 3 is positioned in relation to the structure 16 so that the contact edge 7 engages a circumferentially outer edge 17 of the film pack 15. The structure 16 is rotated in a direction consistent with winding the film 20 so that the film 20 is gathered onto the structure 16. As the film 20 is being gathered on the structure 16, the contact edge 7 aligns the circumferentially outer edge 17 of the film 20 with an adjacent circumferentially inner edge. Rotation 31 of the structure 16 is halted when a desired quantity of the film 20 has been collected. Rotational speed of the structure 16 can be varied as the film 20 is being wound 19 onto the structure 16. The packing guide 3 can be moved away from the structure 16 to allow the structure 16 to be removed. Additionally, a plurality of packing guides 3 may be used to align the film 20.

In another embodiment of a method according to the invention, the film is transported between a first structure and a second structure. A first packing guide and a second packing guide are positioned relative to the first structure and the second structure respectively. The film is repeatedly wound and unwound between the first structure and the second structure. When the first structure is being wound the first packing guide aligns the circumferentially outer edge of the film being wound onto the first structure. Similarly, when the film is unwound from the first structure and wound onto the second structure, the second packing guide aligns the circumferentially outer edge of the film being wound onto the second structure.

The best mode for making the apparatus 1 is to cut a substantially rectangular shape from a polyester film, for example, such as DuPont MYLAR™ polyester film, to form the packing guide 3. The polyester film should be approximately 0.13 millimeters thick. Support member 8 is made from aluminum. The support end 5 of the packing guide 3 is attached to the support member 8 using an adhesive. The support member 8 is attached to a structure so that the packing guide 3 is fixedly positioned relative to the film pack 15 to be wound. Further, support member 8 positions the packing guide 3 so that the surface angle 47 is 0 degrees, the edge angle 49 is 2 degrees, and the guide angle 65 is 10 degrees.

Although several embodiments of the present invention have been disclosed and illustrated, the invention is not limited to the specific forms or arrangements of parts so described and illustrated. The invention is only limited by the claims.

What is claimed is:

1. A device for packing film uniformly, comprising:
   a flexible sheet of elastic material having a support edge and a contact edge, the sheet defining a packing guide; and
   support means connected to the support edge for supporting the packing guide, the support means operative to orient the contact edge at an edge angle with respect to a wound surface of a film pack, and wherein contact between the contact edge and a circumferentially outer edge of the film pack occurs only at a footprint of an area defining a contact patch, whereby as the film is wound the contact patch advances along the contact edge.

2. The device of claim 1, wherein the support means comprises a cantilever having a distal and proximal ends, the cantilever stationary with respect to the film pack, the support edge of the packing guide connected to the proximal end, the distal end adapted for attachment to a support.

3. The device of claim 2, wherein the cantilever is adapted for rotation about a longitudinal axis, rotation of the cantilever is operative to modulate contact force between the contact edge and the circumferentially outer edge of the film pack.

4. The device of claim 1, wherein material for the packing guide is selected from the group consisting of polyesters, elastomers, plastics, metal, paper, ceramics, and composites.

5. The device of claim 1, wherein the packing guide further comprises a bearing surface deposited on the contact edge, the bearing surface operative to reduce friction and wear between the contact edge and the circumferentially outer edge of the film pack.

6. The device of claim 1, wherein flexibility of the packing guide is tuned by a flexibility tuner disposed inset from the contact edge and in communication with the packing guide.

7. The device of claim 6, wherein the flexibility tuner is selected from the group consisting of perforations, dimples, grooves, pleats, or corrugations.

8. A device for packing film uniformly, comprising:
   a flexible sheet of elastic material having a support edge and a contact edge, the contact edge extending outward of the support edge, the sheet defining a packing guide; and
   support means connected to the support edge for supporting the packing guide, the support means operative to orient the contact edge of the packing guide with a circumferentially outer edge of a film pack so that the contact edge is urged into contact with the circumferentially outer edge of the film pack with a first force as the film pack is wound, the support means operative to incline the packing guide at an angle with respect to a wound surface of the film pack so that as the film pack is wound an air flow is induced and the angle of the packing guide operates to redirect the air flow in a direction away from the wound surface and the redirected air flow applies a second force on the packing guide such that the contact edge is urged into contact with the circumferentially outer edge of the film pack by a net force that is greater than the first force.

9. The device of claim 8, wherein the angle is from about 10 degrees to about 20 degrees.

10. The device of claim 8, wherein as the film pack is unwound the air flow impinges on the packing guide and is operative to apply a lift force on the packing guide such that the contact edge is urged away from the circumferentially outer edge of the film pack by the lift force and the net force acting on the contact edge is less than the first force, whereby as the film pack is unwound, friction and wear between the contact edge and the circumferentially outer edge is reduced by lower contact force between the contact edge and the circumferentially outer edge.

11. A method of winding a film, comprising the steps of:
    attaching a film to a structure adapted for receiving the film;
    positioning a packing guide in relation to the structure, the packing guide having support member for fixedly supporting the packing guide and for orienting a contact edge of the packing guide with a circumferentially outer edge of the film so that the contact edge is urged into contact with the circumferentially outer edge;
    rotating the structure to gather the film onto the structure, whereby as the structure is rotated and the film is gathered onto the structure the contact edge aligns the circumferentially outer edge with an adjacent circumferentially inner edge of the film and the adjacent film edges are substantially planar;
    halting rotation of the structure when a predetermined amount of film has accumulated on the structure; and
    moving the packing guide out of position relative to the structure, whereby the wound structure can be removed and new structure can be positioned for winding.

12. A method of transporting film, comprising the steps of:
    positioning a first packing guide in relation to a first structure on which a film pack has already been wound, the first structure adapted for rotation about a first axis, the first packing guide having a support member for supporting the first packing guide and for orienting a contact edge of the first packing guide at an edge angle with respect to a wound surface of the film so that the contact edge is urged into contact with a circumferentially outer edge of the film at a contact patch;
    attaching a free end of the film to a second structure adapted to receive the film;
    positioning a second packing guide in relation to the second structure, the second structure adapted for rotation about a second axis, the second packing guide having a support member for supporting the second packing guide and for orienting a contact edge of the second packing guide at an edge angle with respect to a circumferentially outer edge of the film so that the contact edge is urged into contact with the circumferentially outer edge at a contact patch; and rotating the second structure about the second axis to gather the film as the film is unwound from the first structure, whereby as the second structure is rotated and the film is wound onto the second structure the contact edge of the second packing guide engages the circumferentially outer edge at the contact pact and aligns the circumferentially outer edge with an adjacent circumferentially inner edge of the film and the adjacent film edges are substantially planar.

* * * * *

UNITED STATES PATENT AND TRADEMARK OFFICE
CERTIFICATE OF CORRECTION

PATENT NO.   : 6,045,086
DATED        : April 4, 2000
INVENTOR(S)  : James M. Jonza, Andrew J. Ouderkirk, Michael F. Weber It is certified that error appears in the above-identified patent and that said Letters Patent is hereby corrected as shown below:

Column 16,
Line 43, "ere" should read -- were --

Column 23,
Line 39, "70°C" should read -- 7°C --.

Column 24,
Line 30, "1490°C" should read -- 149°C --.

Column 27,
Line 66, "525IF(274IC)" should read -- 525°F(274°C) --.

Signed and Sealed this

Fifth Day of March, 2002

Attest:

JAMES E. ROGAN
*Attesting Officer*   *Director of the United States Patent and Trademark Office*